J. AUSTIN.
SHOVEL AND SUPPORT THEREFOR.
APPLICATION FILED OCT. 21, 1907.

898,623.

Patented Sept. 15, 1908.
3 SHEETS—SHEET 1.

Witnesses
J. M. Fowler Jr.
A. S. Kitchin

Inventor
John Austin
By Mason, Fenwick & Lawrence
Attorneys

J. AUSTIN.
SHOVEL AND SUPPORT THEREFOR.
APPLICATION FILED OCT. 21, 1907.
898,623.
Patented Sept. 15, 1908.
3 SHEETS—SHEET 2.
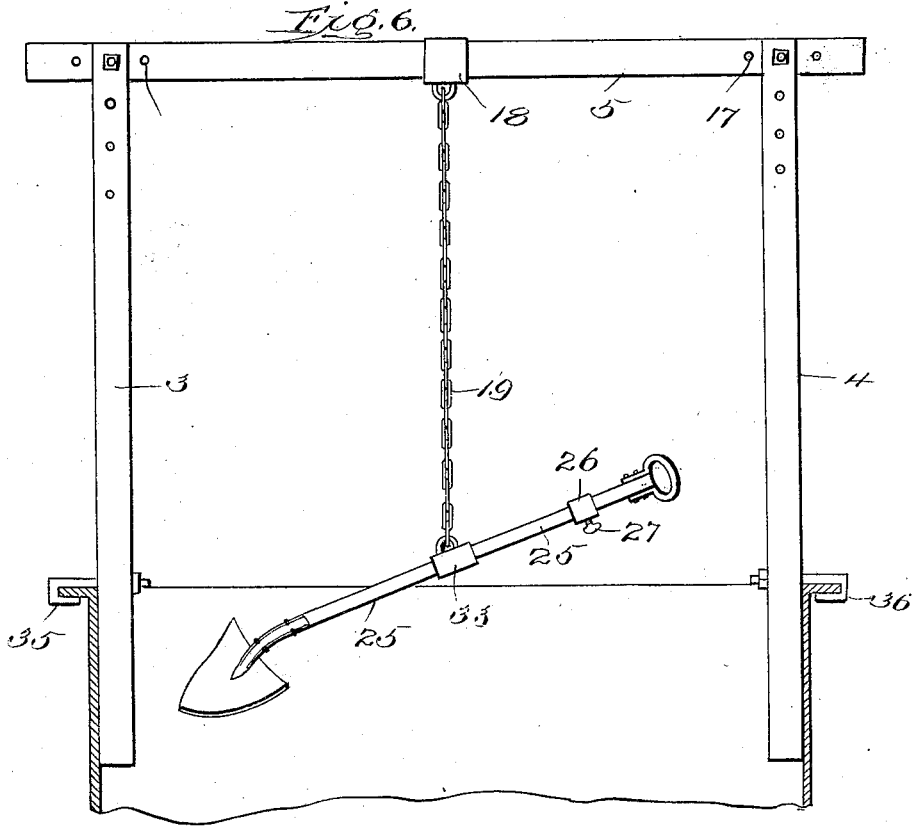
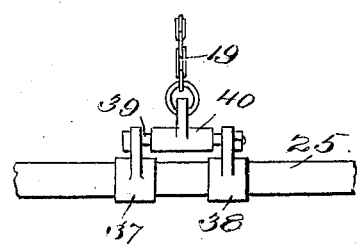
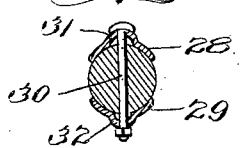
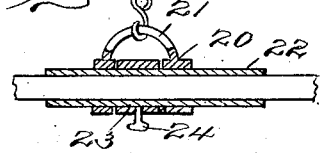

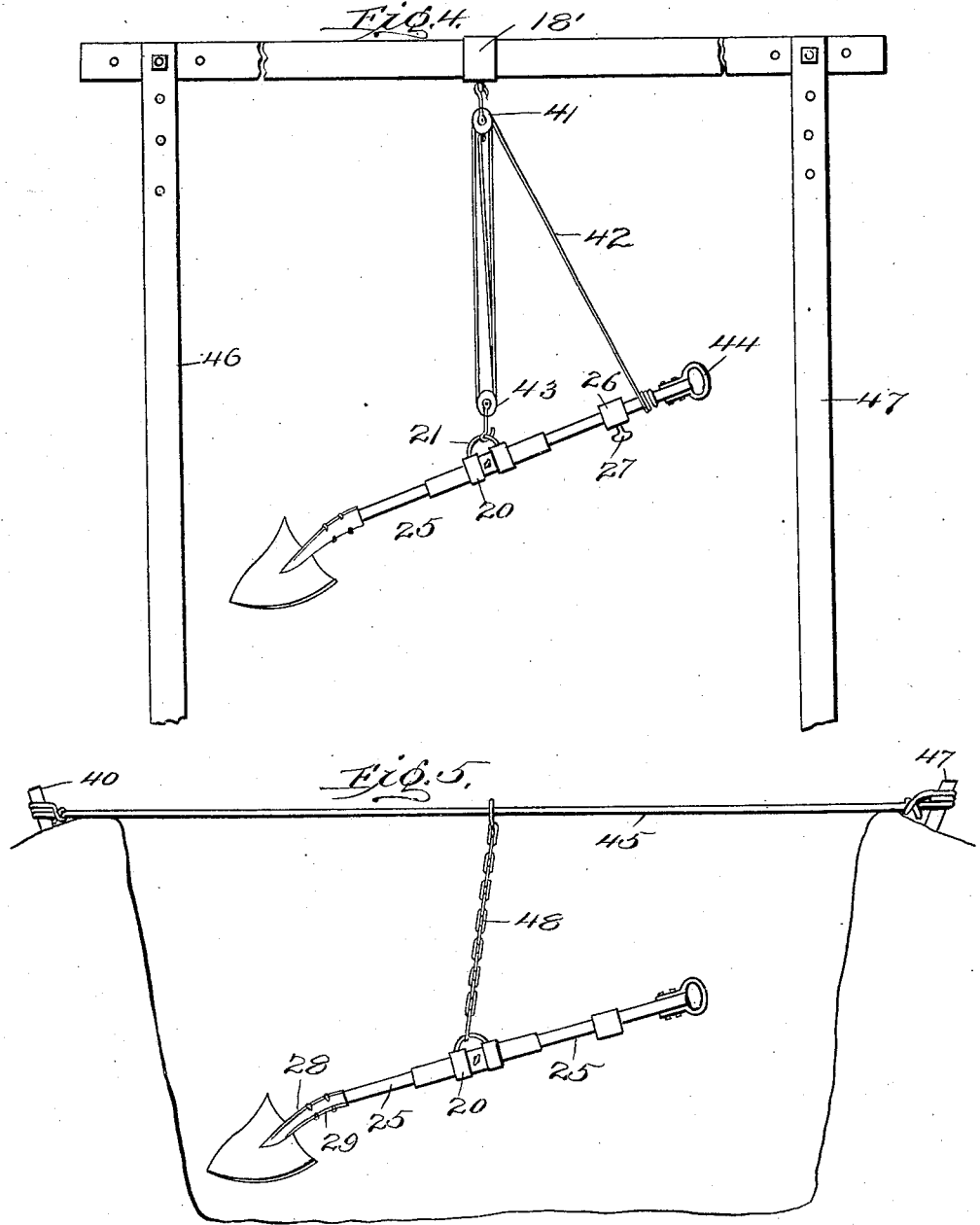

UNITED STATES PATENT OFFICE.

JOHN AUSTIN, OF ST. REGIS, MONTANA.

SHOVEL AND SUPPORT THEREFOR.

No. 898,623.     Specification of Letters Patent.     Patented Sept. 15, 1908.

Application filed October 21, 1907. Serial No. 398,510.

*To all whom it may concern:*

Be it known that I, JOHN AUSTIN, a citizen of the United States, residing at St. Regis, in the county of Missoula and State of Montana, have invented certain new and useful Improvements in Shovels and Supports Therefor; and I do hereby declare the following to be a full, clear, and exact description of the invention, such as will enable others skilled in the art to which it appertains to make and use the same.

This invention relates to improvements in excavating mechanism and particularly to means for easily manipulating and securing the largest possible amount of work from the use of a shovel.

The invention comprises the producing of a frame work and sustaining means upon which a shovel of any desired construction is designed to be positioned so that the sustaining means and frame work may be used as a movable fulcrum for the shovel.

The invention further comprises the provision of a swinging support secured to a sleeve in which a shovel handle is positioned so that the sleeve together with the support may act as a movable and swinging fulcrum in using the shovel, in excavating and shoveling material.

The object in view is the provision of a swinging support to which a shovel may be removably secured so as to have a movable fulcrum that may be easily and conveniently shifted so as always to be able to use the same as a fulcrum during the normal operation of the shovel.

Another object in view is the provision of a frame work that may be secured to a car or above an excavation of any kind to which is removably secured a sustaining fulcrum as a chain for providing means for holding a shovel so that the same may excavate the matter desired to be excavated or move the material from the car with ease and rapidity, without compelling the operator to bear the weight of the shovel and also the load.

With these and further objects in view, the invention comprises certain novel constructions, combinations and arrangements of parts as will be hereinafter fully described and claimed.

Figure 1:
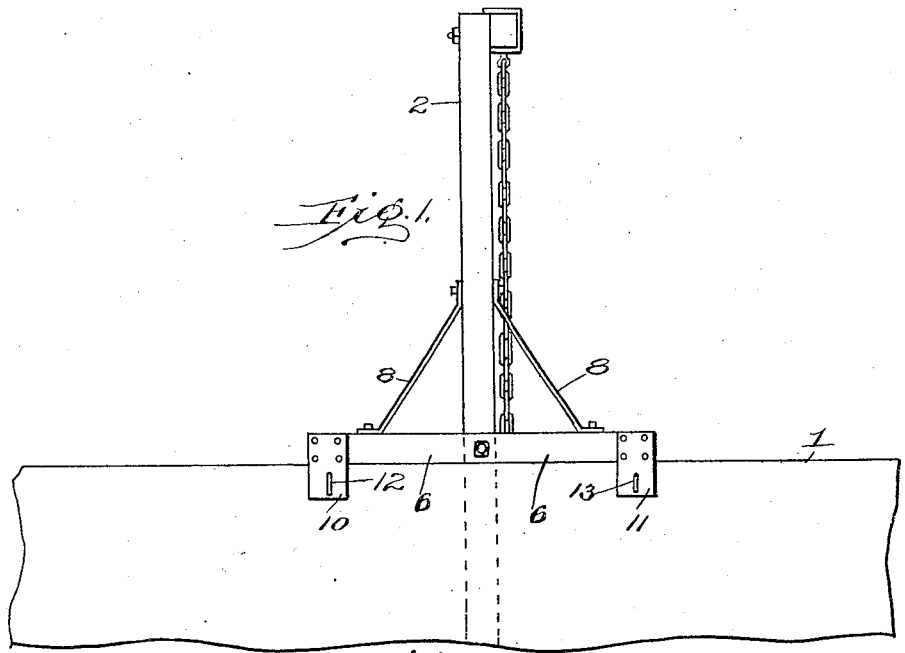
Figure 2:
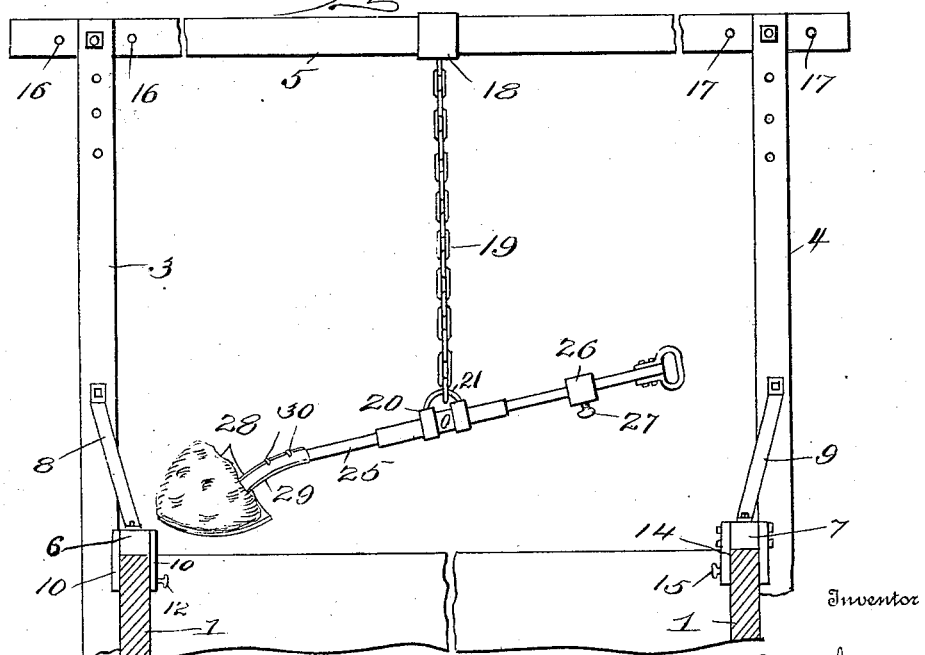

In the accompanying drawings:—Figure 1 is an edge view of a supporting frame and swinging fulcrum secured thereto, the same being shown in connection with a car. Fig. 2 is a side elevation of Fig. 1. Fig. 3 is a detail, fragmentary, sectional view of a sleeve and sustaining means connected therewith forming a part of the present invention. Fig. 4 is a side elevation of the supporting frame and elevating means secured thereto, forming a modified form of the present invention. Fig. 5 is a side elevation of a swinging fulcrum and shovel positioned therein forming a part of the present invention, the same being shown in connection with a sustaining member for permitting the shovel to excavate earth. Fig. 6 is a side elevation of a frame and a slightly modified form of supporting fulcrum. Fig. 7 is a detail, fragmentary, sectional view through a supporting sleeve forming a part of the fulcrum shown in Fig. 6. Fig. 8 is a detail, fragmentary, side elevation of a slightly modified form of supporting sleeve. Fig. 9 is a detail, sectional view through the handle of the shovel at the point of connection between the shovel proper and the handle.

In using shovels and the like for excavating or for moving matter in bulk, it is customary to simply force the shovel into the matter desired to be moved, and then press down on the handle using part of the earth as a fulcrum to loosen the part above the shovel. The shovel together with the loosened matter is then raised and the shovel is swung for creating momentum for throwing the matter from the shovel to any desired place. By this way of using the shovel, not only the shovel must be elevated, but also the material being moved. In addition also the fulcrum used sometimes is not very satisfactory and consequently the operator uses his knee as a fulcrum so as to more readily remove the matter desired to be moved.

In the present invention I have designed to provide means that will provide a ready fulcrum and also supporting means for any ordinary or preferred form of shovel.

Referring more particularly to the drawings, 1 indicates a car frame of any desired construction upon which is mounted a frame 2. The frame 2 is constructed preferably with side members 3 and 4 and a cross beam of support 5, as clearly seen in Fig. 2. The supporting beams or members 3 and 4 may be of any desired length so as to support cross beams 5 at any desired height above the material being moved or excavated. Secured to upright or member 3 is a supporting bar 6 and secured to upright 4 is another supporting bar 7 that is designed to normally rest along the upper edge of a car or the like. Suitable braces 8, 8 and 9, 9 are provided for holding uprights 3 and 4 in a car positioned substantially at a right angle to bars 6 and 7. Secured to the ends of bar 6 are projecting members or ears 10, 10 and 11, 11 for passing on each side of the sides of the car 1, as clearly seen in Fig. 2. Set screws 12 and 13 are secured to members 10 and 11 so as to hold bar 6 in correct position. Bar 7 is also provided with ears 14 and a set screw 15 in a similar manner to the way in which bar 6 is provided with depending members or ears.

Beam 5 is provided with apertures 16 and 17 upon each end of the beams respectively, so that uprights 3 and 4 may be adjusted to any width of car or other device to which the same may be applied. Surrounding bar or beam 5 is a sleeve 18 that is slidably mounted thereon and is designed to support a chain 19 which in turn supports a pair of supporting members or rings 20. The rings 20 are spaced apart any desirable distance but are joined together firmly by a connecting arm or bar 21. The supporting member 20 is designed to have positioned therein a sleeve 22. The sleeve 22 is loosely positioned in the rings of member 20, but is prevented from longitudinal movement by a collar 23 carrying a set screw 24 that is positioned between the rings of member 20. Preferably I make the collar 23 of such size as to loosely contact with the rings of member 20 so as to not permit any unnecessary movement therebetween. Positioned within sleeve 22 is a handle 25 of any desired kind of shovel. The sleeve 22 is designed to be made of such a size as to permit handle 25 to tightly fit therein, so as to permit easy movement of the handle so that the fulcrum provided by chain 19, sleeve 22 and surrounding parts may be varied readily and as often as desired. In order to counter-balance the material being shoveled or moved I may provide a weight 26 held in place at any desired point along the handle 25 by a set screw 27. In providing a shovel I preferably provide one that is comparatively very strong because by using the fulcrum created by the supporting frame, chain 19 and sleeve 22, heavy materials may be easily moved and operated upon, which would be liable to break the shovels if not strongly made.

In order to provide a shovel of this description I provide one that may be of any shape, but of comparatively heavy material and formed with receiving members 28 and 29, as clearly seen in Figs. 2 and 9. Members 28 and 29 are formed integral with the shovel proper and form a kind of socket in which handle 25 is positioned. In order to hold handle 25 firmly in position I provide securing members or bolts 30 that pass through both members 28 and 29 and handle 30, as clearly seen in Fig. 9. Members 28 and 29 are both formed with raised portions or ridges 31 and 32 for forming a bracing member. By this means a shovel is provided that has a very strong receiving socket for receiving a handle as 25 and one that is designed to resist strains that may be brought upon the shovel.

In constructing the present invention various slightly modified forms in the detail construction may be provided without departing from the spirit of the invention. In Fig. 6 will be observed a slight change in the supporting sleeve but within the spirit of the invention. Referring more particularly to Fig. 6 there is provided uprights 3 and 4 and a cross beam 5 together with a supporting bar or beam 6, sleeve 18 and chain 19. To the chain 19 is provided a supporting sleeve 33 that is designed to encircle the handle 25 of a shovel. The sleeve 33 is secured to chain 19 by means of a suitable swivel 34, as clearly seen in Fig. 7, so that the shovel may receive any pivotal movement without tangling chain 19. Retaining braces or bolts 35 and 36 are provided for holding the uprights 3 and 4 in position. Bars 35 and 36 are formed hook shaped in contour to engage the flange on cars that are of this construction.

In Fig. 8 will be observed another slightly modified form of supporting sleeve. In this figure the sleeve is made in two parts, as rings 37 and 38. Rings 37 and 38 are connected by a journaled or pivotal bar 39 which has journaled thereon a pivotal supporting member 40 which is secured to a flexible supporting member as chain 19. A handle as 25 of a shovel is designed to pass through rings 37 and 38 and to tightly fit therein so as not to permit any longitudinal movement.

In Fig. 4 I have shown means for varying the elevation quickly and easily of the shovel during operation or at any desired time. In this figure a frame work of any desired kind is provided as for instance the kind shown in Fig. 2, which is provided with a sleeve 18' similar to sleeve 18. To sleeve 18' is pivotally secured a pulley 41 through which a cable 42 of any desired kind is designed to pass. Positioned below pulley 41 and designed to accommodate cable 42 is another pulley 43 that is designed to engage connecting bar 21 of the preferred construction or to engage any of the supporting members that surround the handle 25. By this construction a shovel full of material may be elevated to any desired point before its discharge from the shovel. In working this form of fulcrum or sustaining means, the cable 42 is allowed to pay out so as to lower the shovel, and after the shovel has received its load it is brought to a substantially horizontal position in the usual manner by forcing down the grip 44, and then giving a swinging motion for discharging the material. If it is desired to raise the shovel, cable 42 is pulled during the swinging movement of the shovel, or before as may seem most desirable.

Referring to Fig. 5, the same shows how the present invention may be adapted for excavating places in the earth. When excavating places in the earth, a cross bar or member, as cable 45, is provided that may be supported by any means, either by uprights as 3 and 4, or as shown in Fig. 4 by posts 46 and 47 that are driven into the earth. Cable 45 is stretched between these two posts and is designed to support a chain or cable 48 which in turn supports a supporting member as 20 as heretofore described.

By providing a swinging sustaining means or fulcrum according to the present invention, a shovel of any desired kind may be supported in position for being forced into the earth or any material designed to be moved and then pivotally swung to a substantially horizontal position, and from this position moved for discharging the material in the usual manner that shovels are used. It will, of course, be evident that a cable, rope or the like may be substituted for the chain, and that the same may be of any desired length so that the shovel may be positioned at any predetermined distance above the earth as may be desired. The sustaining rod or chain 19 may be lengthened or shortened for various purposes as may be desired, for instance as the material being excavated is moved, the cable or chain is lengthened so as to keep the shovel near the material for more easy operation.

What I claim is:—

1. In a device of the character described, a frame, a fulcrum, a chain for supporting said fulcrum means for mounting a shovel on said fulcrum and means for varying the position of said chain.

2. In a device of the character described, a movable frame, means for adjusting the position of said frame, a swinging fulcrum secured to said frame, and a sleeve for removably securing a shovel to said fulcrum.

3. In a device of the character described, a frame, a fulcrum secured thereto, and a sleeve for securing the shovel to said fulcrum.

4. In a device of the character described, a frame, a movable fulcrum secured thereto, and a sleeve for securing a shovel to said fulcrum.

5. In a device of the character described, a frame, a swinging fulcrum secured thereto, means for changing the position of said fulcrum on said frame, and a sleeve for securing to said fulcrum a shovel.

6. In a device of the character described, a frame, a fulcrum secured thereto, a chain for varying the position of said fulcrum, and a sleeve for securing a shovel to said fulcrum.

7. In a device of the character described, a frame, a movable fulcrum secured to said frame, means for varying the position of said fulcrum, and a sleeve for loosely securing a shovel to said fulcrum.

8. In a device of the character described, a frame, a fulcrum secured thereto, a sleeve secured to said fulcrum, and means for holding said sleeve in position, said sleeve being adapted to receive a shovel handle.

9. In a device of the character described, a frame, a swinging fulcrum, a sleeve adapted to receive the handle of a shovel, sustaining means surrounding said sleeve and secured to said fulcrum, and means for holding said sleeve in said sustaining means.

10. In a device of the character described, a frame, a swinging fulcrum, a sustaining member pivotally secured to said fulcrum and formed with a ring and a sleeve passing through said ring adapted to receive the handle of a shovel.

11. In a device of the character described, a frame, a swinging fulcrum, a chain for supporting said fulcrum means for removably securing a shovel to said fulcrum, and means for varying the swinging movement of said fulcrum.

12. In a device of the character described, a frame, a swinging fulcrum, a pivotally mounted sleeve for loosely securing thereto a shovel, and means for balancing said shovel on said fulcrum.

13. In a device of the character described, a frame, a movable fulcrum, a sustaining member comprising a plurality of journal members, and means for connecting the same, said journal members being designed to support a shovel.

14. In a device of the character described, a frame, a movable fulcrum, a sustaining member comprising a plurality of rings, and a connecting member, means for limiting the position of said ring, said rings being designed to support a shovel.

15. In a device of the character described, comprising a support, a shovel formed with socket members for receiving a handle, said socket members being formed with ridges for strengthening the same, and means for loosely securing the handle of said shovel pivotally to said support.

In testimony whereof I affix my signature in presence of two witnesses.

JOHN AUSTIN.

Witnesses:
ODEN ODELL,
J. O. STRANDMARK.